United States Patent
D'Souza et al.

(10) Patent No.: US 8,522,829 B2
(45) Date of Patent: Sep. 3, 2013

(54) MICROPHERE-CONTAINING INSULATION

(75) Inventors: Andrew S. D'Souza, Little Canada, MN (US); Robert W. Hunter, Burnsville, MN (US); Maria B. Urquiola, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 896 days.

(21) Appl. No.: 12/516,410

(22) PCT Filed: Nov. 27, 2007

(86) PCT No.: PCT/US2007/085558
§ 371 (c)(1),
(2), (4) Date: Jan. 22, 2010

(87) PCT Pub. No.: WO2008/067267
PCT Pub. Date: Jun. 5, 2008

(65) Prior Publication Data
US 2010/0126618 A1    May 27, 2010

Related U.S. Application Data

(60) Provisional application No. 60/867,701, filed on Nov. 29, 2006.

(51) Int. Cl.
*F16L 9/14*    (2006.01)

(52) U.S. Cl.
USPC .......................... 138/149; 138/141; 138/146

(58) Field of Classification Search
USPC ......................................... 138/149, 141, 146
See application file for complete search history.

(56) References Cited

U.S. PATENT DOCUMENTS

| | | |
|---|---|---|
| 2,978,340 A | 4/1961 | Veatch et al. |
| 3,030,215 A | 4/1962 | Veatch et al. |
| 3,129,086 A | 4/1964 | Veatch et al. |
| 3,230,064 A | 1/1966 | Veatch et al. |
| 3,365,315 A | 1/1968 | Beck et al. |

(Continued)

FOREIGN PATENT DOCUMENTS

| | | |
|---|---|---|
| GB | 2269876 A | 2/1994 |
| GB | 2271410 A | 4/1994 |

(Continued)

OTHER PUBLICATIONS

Clover Jr., Lower Extremity Thermoplastics: An Overview, Journal of Prosthetics and Orthotics, vol. 3, No. 1, 1991, pp. 9-13.

(Continued)

*Primary Examiner* — James Hook

(57) ABSTRACT

An insulated article having a first insulation region comprising a first polymeric material and first hollow ceramic microspheres and a second insulation region comprising a second polymeric material and second hollow ceramic microspheres. The first insulation region has a thermal conductivity that is no greater than the thermal conductivity of the first polymeric material and a volumetric heat capacity in a range of 60% to 90% of the volumetric heat capacity of the first polymeric material. The second insulation region has a thermal conductivity that is no greater than 90% of the thermal conductivity of the second polymeric material and a volumetric heat capacity that is less than 60% of the volumetric heat capacity of the second polymeric material. A method for making a composition for insulating an article is also described.

20 Claims, 1 Drawing Sheet

(56) References Cited

U.S. PATENT DOCUMENTS

| | | | |
|---|---|---|---|
| 3,812,886 A * | 5/1974 | Hallwood | 138/149 |
| 4,303,061 A | 12/1981 | Torobin | |
| 4,303,732 A | 12/1981 | Torobin | |
| 4,391,646 A | 7/1983 | Howell | |
| 4,767,726 A | 8/1988 | Marshall | |
| 4,900,488 A | 2/1990 | Collins | |
| 4,983,550 A | 1/1991 | Goetz et al. | |
| 5,495,546 A | 2/1996 | Bottoms, Jr. et al. | |
| 6,172,134 B1 | 1/2001 | Cooke | |
| 6,367,549 B1 | 4/2002 | Chatterji et al. | |
| 6,387,447 B1 | 5/2002 | Grimm et al. | |
| 6,397,895 B1 * | 6/2002 | Lively | 138/146 |
| 6,403,180 B1 * | 6/2002 | Barrall | 428/36.5 |
| 6,464,770 B1 | 10/2002 | Palm et al. | |
| 6,527,015 B2 * | 3/2003 | Lively | 138/149 |
| 6,531,222 B1 | 3/2003 | Tanaka et al. | |
| 6,858,280 B2 | 2/2005 | Allen et al. | |
| 6,910,507 B2 | 6/2005 | Simon et al. | |
| 7,049,349 B2 | 5/2006 | Sauvant-Moynot et al. | |
| 2002/0004111 A1 | 1/2002 | Matsuhara et al. | |
| 2002/0106501 A1 | 8/2002 | Debe | |
| 2003/0190433 A1 | 10/2003 | Andreani | |
| 2005/0095380 A1 | 5/2005 | Watkins et al. | |
| 2006/0032588 A1 | 2/2006 | Appleby et al. | |
| 2006/0105053 A1 | 5/2006 | Marx et al. | |
| 2006/0118989 A1 | 6/2006 | Shinbach et al. | |
| 2006/0122049 A1 | 6/2006 | Marshall et al. | |
| 2006/0131027 A1 | 6/2006 | Chiesa | |
| 2006/0243363 A1 | 11/2006 | Hunter et al. | |
| 2007/0104943 A1 | 5/2007 | D'Souza | |
| 2010/0154917 A1 * | 6/2010 | Batallas et al. | 138/141 |

FOREIGN PATENT DOCUMENTS

| | | |
|---|---|---|
| GB | 2306127 A | 4/1997 |
| GB | 2431974 A | 5/2007 |
| WO | WO 93/19927 | 10/1993 |
| WO | WO 94/04865 A | 3/1994 |
| WO | WO 99/05447 | 2/1999 |
| WO | WO 99/57182 | 11/1999 |
| WO | WO 01/14273 A1 | 3/2001 |
| WO | WO 03/087205 A1 | 10/2003 |
| WO | WO 2005/025830 A1 | 3/2005 |
| WO | WO 2005/113631 A1 | 12/2005 |
| WO | WO 2006/062566 A1 | 6/2006 |

OTHER PUBLICATIONS

Wunderlich, Thermal Characterization of Polymeric Materials, Thermal Analysis, Academic Press, 1981, Edith A. Turi, Ed., Chapter 2 Table of Contents, pp. 91.

PCT International Search Report, PCT/US2007/085558, dated May 19, 2008, 4 pages.

* cited by examiner

MICROPHERE-CONTAINING INSULATION

Cross Reference to Related Applications

This application is a national stage filing under 35 U.S.C. 371 of PCT/US2007/085558, filed Nov. 27, 2007, which claims priority to U.S. Provisional Application No. 60/867,701, filed Nov. 29, 2006, the disclosure of which is incorporated by reference in its entirety herein.

BACKGROUND

Syntactic foams containing hollow ceramic microspheres are used for insulation in a variety of applications due in part to their low thermal conductivities. For example, syntactic foams are used in wet insulation applications (i.e., insulation that is exposed to sea water) for off-shore oil pipelines or flowlines. In these pipelines or flowlines, the temperature of the surrounding water can be less than 10° C., which can lead to extensive heat loss from the oil present in the pipe. Such heat loss can result in a reduction of the flow of oil due to an increase in viscosity of the oil and/or precipitation of paraffins and/or asphaltenes present in the oil. Some wet insulation systems combine unfilled polymer layers with syntactic foam layers in order to maintain the temperature of the oil in the pipelines or flowlines as close to the production temperature as possible. However, unfilled polymer layers typically exhibit higher volume shrinkage and/or have higher coefficients of thermal expansion than typical syntactic foams, which could cause stresses within or between the insulation layers. One solution to the problem of shrinkage in an unfilled polypropylene insulation layer is to add solid glass beads to the polypropylene; however, this composition tends to have excessive thermal conductivity. There is a need for alternative syntactic foam insulation systems to meet the demands of severe environments, (e.g., off-shore oil pipelines or flowlines).

SUMMARY OF THE INVENTION

In one aspect, the present invention provides an insulated article, comprising:
an article having a surface;
a first insulation region substantially covering the surface of the article, the first insulation region having a first thermal conductivity and a first volumetric heat capacity, the first insulation region comprising a first polymeric material and at least 10% by volume first hollow ceramic microspheres, based on the total volume of the first insulation region, wherein the first polymeric material has a second thermal conductivity and a second volumetric heat capacity, wherein the first thermal conductivity is no greater than the second thermal conductivity, and wherein the first volumetric heat capacity is in a range from 60% to 90% of the second volumetric heat capacity; and
a second insulation region substantially covering the surface of the article, wherein the first insulation region is interposed between the article and the second insulation region, the second insulation region having a third thermal conductivity and a third volumetric heat capacity, the second insulation region comprising a second polymeric material and second hollow ceramic microspheres, wherein the second polymeric material has a fourth thermal conductivity and a fourth volumetric heat capacity, wherein the third thermal conductivity is not greater than 90% of the fourth thermal conductivity, wherein the third volumetric heat capacity is less than 60% of the fourth volumetric heat capacity, and wherein the first polymeric material and the second polymeric material are independently selected from the group consisting of thermoplastics, thermosets, and mixtures thereof.

In another aspect, the present invention provides an insulated article, comprising:
an article having a surface;
a first insulation region substantially covering the surface of the article, the first insulation region having a first thermal conductivity and a first volumetric heat capacity, the first insulation region comprising a first polymeric material and at least 10% by volume first hollow ceramic microspheres, based on the total volume of the first insulation region, wherein the first polymeric material has a second thermal conductivity and a second volumetric heat capacity, wherein the first thermal conductivity is no greater than the second thermal conductivity, and wherein the first volumetric heat capacity is in a range from 60% to 90% of the second volumetric heat capacity; and
a second insulation region substantially covering the surface of the article, the second region having a third thermal conductivity and a third volumetric heat capacity, the second insulation region comprising a second polymeric material and second hollow ceramic microspheres, wherein the second polymeric material has a fourth thermal conductivity and a fourth volumetric heat capacity, wherein the third thermal conductivity is not greater than 90% of the fourth thermal conductivity, wherein the third volumetric heat capacity is less than 60% of the fourth volumetric heat capacity, and wherein the first polymeric material and the second polymeric material are independently selected from the group consisting of thermoplastics, thermosets, and mixtures thereof, with the proviso that at least one of the first polymeric material or the second polymeric material is a thermoplastic.

In another aspect, the present invention provides a method for making a composition for insulating an article having a surface, the method comprising:
obtaining requirements data defining thermal requirements for a first insulation region having a first thermal conductivity and a first volumetric heat capacity and a second insulation region having a third thermal conductivity and a third volumetric heat capacity, wherein the first insulation region and the second insulation region substantially cover the surface of the insulated article;
based at least partially on the thermal requirements for the first insulation region, generating a first formulation for a composition for the first insulation region, the composition comprising a first polymeric material selected from the group consisting of thermoplastics, thermosets, and mixtures thereof and at least 10% by volume first hollow ceramic microspheres, based on the total volume of the first insulation region, wherein the first polymeric material has a second thermal conductivity and a second volumetric heat capacity, wherein the first thermal conductivity is no greater than the second thermal conductivity, and wherein the first volumetric heat capacity is in a range from 60% to 90% of the second volumetric heat capacity;
based at least partially on the thermal requirements for the second insulation region, generating a second formulation for a composition for the second insulation region, the composition comprising a second polymeric material selected from the group consisting of thermoplastics, thermosets, and mixtures thereof and second hollow ceramic microspheres, wherein the second polymeric material has a fourth thermal conductivity and a fourth volumetric heat capacity, wherein the third thermal conductivity is not greater than 90% of the fourth thermal conductivity, and wherein the third volumetric heat capacity is less than 60% of the fourth volumetric heat capacity;

making a composition for the first insulation region having the first formulation; and making a composition for the second insulation region having the second formulation. In some of these embodiments, the method further comprises applying the compositions for the first and second insulation regions to the article.

In some embodiments of the foregoing aspects, the first hollow ceramic microspheres are glass microbubbles having an average true density in a range from 0.5 g/cm$^3$ to 1.2 g/cm$^3$ (in some embodiments, 0.5 g/cm$^3$ to 1.0 g/cm$^3$ or even 0.5 g/cm$^3$ to 0.8 g/cm$^3$). In some embodiments of the foregoing aspects, the second hollow ceramic microspheres are glass microbubbles having an average true density in a range from 0.1 g/cm$^3$ to 0.5 g/cm$^3$ (in some embodiments, 0.3 g/cm$^3$ to 0.5 g/cm$^3$).

In some embodiments of the foregoing aspects, the insulated article is a conduit. In some embodiments, the conduit is submerged in water (including in an ocean, sea, bay, gulf, lake, or river) at a depth of at least 100 meters (in some embodiments, at least 500 meters, 1000 meters, 1500 meters, 2000 meters, 2500 meters, 3000 meters, or even at least 3500 meters) and the conduit contains at least oil within.

Insulated articles according to the present invention have a first insulation region that typically has a higher volumetric heat capacity than conventional syntactic foam insulation, which may, in some applications (e.g., off-shore oil pipelines or flowlines), result in higher heat storage in the insulation. Increased heat storage in the insulation may be desirable to maintain the temperature of the article if the heat input into the system is diminished. The presence of the two insulation regions, the first insulation region and the second insulation region, allows for independent control of thermal conductivity and volumetric heat capacity in the insulation, for example, the second region can be adjusted to provide the desired thermal conductivity while the first region is adjusted to provide the desired heat capacity. The presence of hollow ceramic microspheres in both the first insulation region and the second insulation region provides an insulation system that has less volume shrinkage and/or thermal expansion coefficient mismatch than insulation systems containing an unfilled polymer layer and a conventional syntactic foam layer.

In this application, the term:

"ceramic" refers to glasses, crystalline ceramics, glass-ceramics, and combinations thereof;

"volume shrinkage" refers to both the crystallization shrinkage of a thermoplastic polymer and the cure shrinkage of a thermoset polymer;

"volumetric heat capacity" refers to the heat capacity of a material multiplied by its density.

All numerical ranges are inclusive of their endpoints unless otherwise stated.

Exemplary articles according to the present invention include conduits, production trees, manifolds, and jumpers, which can be used, for example, in underwater environments (e.g., submerged in the ocean).

DETAILED DESCRIPTION

Figure 1:
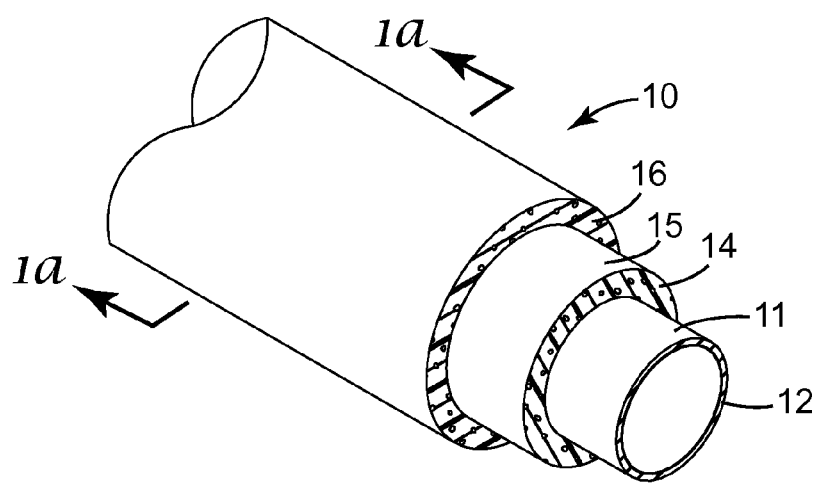
FIG. 1 is a perspective view of an exemplary structure comprising a conduit and first and second insulation regions according to the present invention.
Figure 1A:
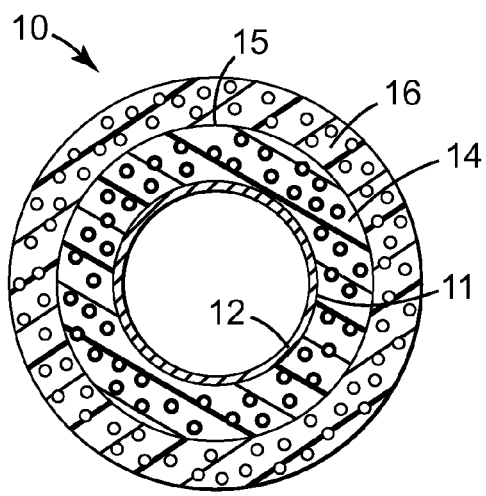
FIG. 1a is a section in a radial plane through FIG. 1, wherein the first insulation region is interposed between the conduit and the second insulation region.

FIGS. 1 and 1a illustrate exemplary insulated conduit 10 according to the present invention comprising conduit 12 having outer surface 11 and first and second insulation regions 14 and 16 substantially covering the surface of the conduit. The first and second insulation regions 14 and 16 comprise first and second hollow ceramic microspheres, respectively, dispersed in a polymeric material. FIG. 1a illustrates that the first insulation region 14 is interposed between the conduit 12 and the second insulation region 16, and the second insulation region 16 substantially covers surface 15 of the first insulation region 14.

Figure 2:
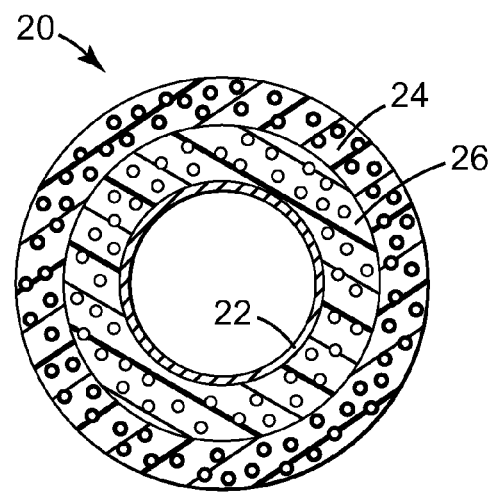
FIG. 2 is a section in a radial plane through another exemplary structure according to the present invention comprising a second insulation region interposed between the conduit and a first insulation region.

FIG. 2 illustrates insulated conduit 20, wherein second insulation region 26 is interposed between conduit 22 and first insulation region 24.

The first insulation region of insulated articles (including insulated conduits) according to the present invention comprises a volume percentage of hollow ceramic microspheres that is effective for at least one of decreasing the volume shrinkage or lowering the thermal expansion coefficient of the first insulation region relative to the first polymeric material. In some embodiments, the first hollow ceramic microspheres comprise at least 15%, 20%, 25%, 30%, 35%, 40%, 45%, or even at least 50% by volume of the first insulation region, based on the total volume of the first insulation region. In some embodiments, the thermal expansion coefficient of the first insulation region over a temperature range that is below the glass transition temperature of the first polymeric material is not greater than 90%, 85%, 80%, 75%, 70%, 65%, 60%, 55%, or even not greater than 50% of the thermal expansion coefficient of the first polymeric material. In some embodiments, wherein the first polymeric material is a thermoset, the cure shrinkage of the first insulation region is not greater than 90%, 85%, 80%, 75%, 70%, 65%, 60%, 55%, or even not greater than 50% of the cure shrinkage of the first polymeric material. In some embodiments, wherein the first polymeric material is a thermoplastic, the crystallization shrinkage of the first insulation region is not greater than 90%, 85%, 80%, 75%, 70%, 65%, 60%, 55%, or even not greater than 50% of the crystallization shrinkage of the first polymeric material. The thermal expansion coefficient of a material (e.g., the first insulation region or the first polymeric material) can be measured by methods known in the art (e.g., thermal mechanical analysis). The crystallization shrinkage of a thermoplastic and the cure shrinkage of a thermoset can be measured by methods known in the art (e.g., by measurement of injected molded thermoplastic samples using ASTM D955, the disclosure of which is incorporated herein by reference, or measurement of molded thermosets using ASTM D6289-03, the disclosure of which is incorporated herein by reference).

The incorporation of hollow ceramic microspheres into a polymeric material generally provides a composite with lower thermal conductivity and volumetric heat capacity relative to that of the polymeric material. In some embodiments of insulated articles according to the present invention, the first thermal conductivity (i.e., the thermal conductivity of the first insulation region) is not greater than 95%, 90%, or even not greater than 85% of the second thermal conductivity (i.e., the thermal conductivity of the first polymeric material). In some embodiments, the first volumetric heat capacity (i.e., the volumetric heat capacity of the first insulation region) is in a range from 60% to 80% or even from 65% to 75% of the second volumetric heat capacity (i.e., the volumetric heat capacity of the first polymeric material). In some embodiments, the third thermal conductivity (i.e., the thermal conductivity of the second insulation region) is not greater than 85%, 80%, 75%, or even not greater than 70% of the fourth thermal conductivity (i.e., the thermal conductivity of the second polymeric material). In some embodiments, the third volumetric heat capacity (i.e., the volumetric heat capacity of the second insulation region) is not greater than 55%, 50%, 45% or even not greater than 40% of the fourth volumetric heat capacity (i.e., the volumetric heat capacity of the second polymeric material).

The thermal conductivity of a polymeric material containing hollow ceramic microspheres can be measured by a variety of techniques known in the art, (e.g., by heat flow measurements in accordance with the ASTM standard C518-98, the disclosure of which is incorporated herein by reference). The heat capacity for a polymeric material containing hollow ceramic microspheres can be measured, for example, by differential scanning calorimetry using techniques known in the art.

First and second hollow ceramic microspheres can be selected for the first and second insulation regions, respectively, based on their thermal conductivities and volumetric heat capacities. For a given polymeric material and a given hollow ceramic microsphere, the rule of mixtures (i.e., a series model) or a flux model (e.g., using Maxwell's equation) can be used to calculate what the thermal conductivity or volumetric heat capacity will be in an insulation region comprising the selected polymeric material and hollow ceramic microsphere. The thermal conductivity of hollow ceramic microspheres can be measured using methods known in the art (e.g., using a thermal properties meter on a degassed sample of hollow ceramic microspheres in a fluid).

In some embodiments, the hollow ceramic microspheres utilized in insulated articles according to the present invention are glass microbubbles. Glass microbubbles are known in the art and can be obtained commercially and/or be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U.S. Pat. App. Pub. No. 2006/0122049 (Marshall et. al), which are incorporated herein by reference for their disclosure of silicate glass compositions and methods of making glass microbubbles). Glass microbubbles may have, for example, a chemical composition wherein at least 90%, 94%, or even 97% of the glass consists essentially of at least 67% $SiO_2$, (e.g., a range of 70% to 80% $SiO_2$), a range of 8% to 15% CaO, a range of 3% to 8% $Na_2O$, a range of 2% to 6% $B_2O_3$, and a range of 0.125% to 1.5% $SO_3$.

When preparing glass microbubbles according to methods known in the art (e.g., by crushing frit and heating the resulting particles to form microbubbles), the amount of sulfur in the glass particles (i.e., feed) and the amount and length of heating to which the particles are exposed (e.g., the rate at which particles are fed through a flame) can typically be adjusted to provide glass microbubbles of a selected density. Lower amounts of sulfur in the feed and faster heating rates lead to higher density bubbles as described in U.S. Pat. No. 4,391,646 (Howell) and U.S. Pat. No. 4,767,726 (Marshall).

The first hollow ceramic microspheres utilized in insulated articles according to the present invention typically have higher true average densities than the second hollow ceramic mircospheres. Hollow ceramic microspheres with higher true average densities typically have higher thermal conductivities and volumetric heat capacities than hollow ceramic microspheres with lower true average densities. The first hollow ceramic microspheres are typically selected based on their density to minimally lower the thermal conductivity and volumetric heat capacity of the first polymeric material. In some embodiments, the first hollow ceramic microspheres (e.g., glass microbubbles) have an average true density in a range from 0.5 $g/cm^3$ to 1.2 $g/cm^3$ (e.g., 0.5 $g/cm^3$, 0.6 $g/cm^3$, 0.7 $g/cm^3$, 0.8 $g/cm^3$, 0.9 $g/cm^3$, 1.0 $g/cm^3$, 1.1 $g/cm^3$, or 1.2 $g/cm^3$), from 0.5 $g/cm^3$ to 1.0 $g/cm^3$, or even from 0.5 $g/cm^3$ to 0.8 $g/cm^3$. Useful first hollow ceramic microspheres include glass microbubbles marketed by Potters Industries, Valley Forge, Pa., (an affiliate of PQ Corporation) under the trade designation "SPHERICEL HOLLOW GLASS SPHERES" (e.g., grades 110P8 and 60P18) and glass bubbles marketed by 3M Company, St. Paul, Minn., under the trade designation "3M GLASS BUBBLES" (e.g., grades S60, S60HS, and iM30K).

In some embodiments, the first hollow ceramic microspheres are aluminosilicate microspheres extracted from pulverized fuel ash collected from coal-fired power stations (i.e., cenospheres). Useful cenospheres include those marketed by Sphere One, Inc., Chattanooga, Tenn., under the trade designation "EXTENDOSPHERES HOLLOW SPHERES" (e.g., grades SG, MG, CG, TG, HA, SLG, SL-150, 300/600, 350 and FM-1); and those marketed by 3M Company under the trade designation "3M HOLLOW CERAMIC MICROSPHERES" (e.g., grades G-3125, G-3150, and G-3500). Cenospheres typically have true average densities in a range from 0.7 $g/cm^3$ to 0.8 $g/cm^3$.

The second hollow ceramic microspheres utilized in insulated articles according to the present invention are typically selected based on their density to lower the thermal conductivity of the second insulation region as much as possible, which also typically results in a low volumetric heat capacity in the second insulation region. In some embodiments, the second hollow ceramic microspheres (e.g., glass microbubbles) have an average true density in a range from 0.1 $g/cm^3$ to 0.5 $g/cm^3$ (e.g., 0.1 $g/cm^3$, 0.2 $g/cm^3$, 0.3 $g/cm^3$, 0.45 $g/cm^3$, or 0.5 $g/cm^3$), or, in some embodiments, 0.3 $g/cm^3$ to 0.5 $g/cm^3$. Useful second hollow ceramic microspheres include glass microbubbles marketed by 3M Company under the trade designation "3M GLASS BUBBLES" (e.g., grades K1, K15, S15, S22, K20, K25, S32, K37, S38, S38HS, S38XHS, K46, A16/500, A20/100, D32/4500, and H50/10000); glass bubbles marketed by Potters Industries under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SIL-CELL" (e.g., grades SIL 35/34, SIL-32, SIL-42, and SIL-43). In some embodiments, the second hollow ceramic microspheres are cenospheres (e.g., hollow spheres marketed by Sphere One, Inc., under the trade designation "EXTENDOSPHERES HOLLOW SPHERES" in grades XOL-200, XOL-150).

The mean particle size of the first and second hollow ceramic microspheres may be, for example, in a range from 5 to 250 micrometers (in some embodiments from 10 to 110 micrometers, from 10 to 70 micrometers, or even from 20 to 40 micrometers). The first and/or second hollow ceramic microspheres may have a multimodal (e.g., bimodal or trimodal) size distribution (e.g., to improve packing efficiency) as described, for example, in U.S. Pat. Appl. Publ. No. 2002/0106501 A1 (Debe).

Suitable first and second polymeric materials utilized in articles according to the present invention may be selected by those skilled in the art, depending at least partially on the desired application. In some embodiments, at least one of the first or the second polymeric material is a thermoplastic. Exemplary thermoplastics include polyolefins (e.g., polypropylene, polyethylene); fluorinated polyolefins (e.g., polytetrafluoroethylene, copolymers of tetrafluoroethylene and hexafloropropylene (FEP), perfluoroalkoxy polymer resin (PFA), polychlorotrifluoroethylene (pCTFE), copolymers of ethylene and chlorotrifluoroethylene (pECTFE), and copolymers of ethylene and tetrafluoroethylene (PETFE)); polyamide, polyamide-imide, polyether-imide, polyetherketone resins, and blends of two or more such resins. In some embodiments, the first polymeric material and the second polymeric material are independently thermoplastics comprising at least one of polypropylene or polyethylene. In some of these embodiments, the thermoplastic is polypropylene. In some embodiments, the thermoplastic is elastomeric. In some embodiments, the at least one of the first or the second polymeric material is a thermoset. Exemplary thermosets include epoxy, polyester, polyurethane, polyurea, silicone, polysulfide, and phenolic. In some embodiments, the first polymeric material and the second polymeric material are independently thermosets selected from the group consisting of epoxy, polyurethane, silicone, and polyester. In some embodiments, one of the first polymeric material or the second polymeric material is a thermoset selected from the group consisting of epoxy, polyurethane, silicone, and polyester. In some embodiments, the thermoset is elastomeric.

Other additives may be incorporated into the first insulation region and/or the second insulation region depending on the application (e.g., preservatives, mixing agents, colorants, dispersants, floating or anti-setting agents, wetting agents, air separation promoters, or water scavengers). In some embodiments, the first insulation region and the second insulation region according to the present invention are essentially free of phase change materials (e.g., powdered waxes).

Insulated articles according to the present invention comprise an article having a surface that is substantially covered by a first insulation region and a second insulation region. "Substantially covered" means that at least 95% (in some embodiments, at least 96%, 97%, 98%, 99%, or even at least 100%) of the surface of the article is covered by the first insulation region and the second insulation region. In some embodiments, at least one of the first insulation region or the second insulation region is at least 1 cm, 2 cm, 3 cm, 4 cm, 5 cm, 6 cm, 7 cm, 8 cm, 9 cm, or even at least 10 cm thick.

Some illustrative examples of syntactic foam manufacturing processes that may be used to provide insulated articles according to the present invention include batch processing, cast curing, meter mixing, reaction injection molding, continuous solids dispersion mixing, centrifugal planetary mixing for thermoset formulations and compounding extrusion and injection molding for thermoplastic formulations.

Insulated articles (e.g., conduits) according to the present invention may be prepared, for example, by first mixing suitable first hollow ceramic microspheres and a premix for a curable thermosetting composition (e.g., for polyurethanes, a mixture comprising liquid polyol resins, chain extenders, catalysts, and driers) and degassing. This premix is mixed with crosslinkers (e.g., for polyurethanes, isocyanate crosslinkers) and immediately dispensed onto a length of conduit (e.g., by pumping into a mold cavity surrounding the length of conduit) to make a conduit having a surface substantially covered with a first insulation region according to the present invention. Following the cure of the thermosetting composition, the process can then be repeated using second hollow ceramic microspheres instead of first hollow ceramic microspheres and optionally a different thermosetting composition to provide an insulated conduit according to the present invention. Using a similar process, the second insulation region may be dispensed onto the conduit prior to the first insulation region. Optionally either the first polymeric material or the second polymeric material could be a thermoplastic.

When at least one of the first polymeric material or second polymeric material is a thermoplastic (e.g., polypropylene), insulated articles (e.g., conduits) according to the present invention may be prepared, for example, by dispersing first suitable hollow ceramic microspheres in the thermoplastic and coating the mixture onto the pipe in a side extrusion or cross-head extrusion process. The process can be repeated using second hollow ceramic microspheres instead of first hollow ceramic microspheres and optionally a different thermoplastic, and the coating of the second insulation region and the first insulation region can be carried out in reverse order. Optionally either the first polymeric material or the second polymeric material could be a thermoset.

In some embodiments of an insulated article according to the present invention, the first insulation region and the second insulation region are located in separate layers. In some embodiments, the second insulation region comprises up to 5, 6, 7, 8, 9, 10, 11, or even up to 12 layers of syntactic foam insulation.

In some embodiments, an insulated article according to the present invention has a third insulation region interposed between the first insulation region and the second insulation region; the third insulation region comprises a gradient of first hollow microspheres and second hollow microspheres. The third insulation region may be incorporated into the insulated conduit, for example, using one of the extrusion processes described above by extruding a series of mixtures comprising thermoplastic and varying ratios of first hollow ceramic microspheres and second hollow ceramic microspheres. Similarly, the molding process described above can be used with a series of mixtures of thermosetting compositions and varying ratios of first hollow ceramic microspheres and second hollow ceramic microspheres.

In some embodiments, an insulated article according to the present invention is submerged in water at a depth of at least 100 meters, 500 meters, 1000 meters, 1500 meters, 2000 meters, 2500 meters, 3000 meters, or even at least 3500 meters. For insulated articles in deep water, suitable first and second hollow ceramic microspheres typically have an isostatic pressure collapse resistance of at least 14 megapascals (MPa) (2000 psi), 20 MPa (3000 psi), 27 Mpa (4000 psi), 38 MPa (5500 psi), or even at least 41 MPa (6000 psi). Hollow ceramic microspheres with these collapse resistances are likely to survive (e.g., without breaking) a thermoplastic extrusion process, harsh handling conditions in the field, and the pressures exerted onto the insulation regions in deep water.

Insulated articles according to the present invention may have other coatings substantially covering their surfaces. For example, insulated conduits according to the present invention may have a fusion bonded epoxy coating substantially covering the surface of the conduit. There also may be adhesives interposed between layers of first and second insulation.

Objects and advantages of this invention are further illustrated by the following non-limiting examples; the particular materials and amounts thereof recited in these examples, as well as other conditions and details should not be construed to unduly limit this invention.

EXAMPLE

Thermal Requirements for a First Insulation Region

A composition having a volumetric heat capacity and thermal conductivity that approach or generally match that of unfilled polypropylene was desired.

A Fox50 Heat Flow Meter (obtained from LaserComp, Saugus, Mass.) was used to measure the thermal conductivity of a 12.7 mm thick sheet of unfilled polypropylene having a density of 0.923 g/cm$^3$ (obtained from W. W. Grainger, Inc., Houston, Tex.) at a mean temperature of 37.5° C. (hot side temperature of 50° C., cold side temperature of 25° C.). The instrument was operated using polymethyl methacrylate calibration (available from Lucite International, Memphis, Tenn., under the trade designation "PERSPEX") in accordance with the ASTM standard C518-98 "Standard Test Method for Steady-State Thermal Transmission Properties by Means of the Heat Flow Meter Apparatus," which is incorporated herein by reference. The thermal conductivity was 0.238 W/mK on the upper plate and 0.225 W/mK on the lower plate, giving a mean thermal conductivity of 0.232 W/mK.

The volumetric heat capacity of polypropylene at 300 K was calculated to be 2.0 J/cm$^3$ K by extrapolation of the data provided in Wunderlich, B. and Gaur, U., *Pure & Appl. Chem.*, Vol. 52, pp. 445-456.

Selection of Hollow Ceramic Microspheres for Generating a First Formulation for a First Insulation Region by Determining Thermal Conductivity and Volumetric Heat Capacity for First Hollow Ceramic Microspheres An intimate mixture of glass microbubbles, obtained from 3M Company under trade designation "3M GLASS BUBBLES iM30K" in glycerol ("Mixture 1") was made in an evacuated Abbess Instruments Hand Mixer (Abbess Instruments, Holliston, Mass.) at a full vacuum, and allowed to de-gas under full vacuum with occasional re-mixing to maintain a homogeneous dispersion of the glass microbubbles in the liquid over a period of 30 minutes. This mixture was made to be 40% by volume hollow glass microbubbles, assuming an average true density of 0.6 g/cm$^3$ for the glass microbubbles, and 1.26 g/cm$^3$ for glycerol. The chamber was vented to atmospheric pressure, and the thermal properties were measured using a KD2 Pro Thermal Properties Meter from Decagon Devices (Pullman, Wash.) with a SH-1 Dual Needle, at a "near ambient" average temperature of approximately 25° C. The averages of 14 replicate measurements of thermal conductivity (K) and volumetric heat capacity (C) for Mixture 1 are given in Table 1 (below).

TABLE 1

| sample | K (W/mK) | C (mJ/(m$^3$K)) |
|---|---|---|
| Mixture 1 | 0.23 | 1.97 |
| Glycerol | 0.28 | 2.82 |

For reference, pure glycerol (ACS Specification minimum 99.5% purity) was degassed in the vacuum mixer and measured on the thermal properties meter with the average of 4 measurements given in Table 1 (above).

The apparent thermal conductivity (K) of the glass microbubble iM30K was calculated using the rule of mixtures, wherein:

$K$(mixture 1)=$K$(glycerol)*Volume Fraction (VF) (glycerol)+$K(iM30K)$*VF $(iM30K)$.

After substituting for the volume fractions used for the mixture above and the K for the mixture, K(iM30K)=0.166 W/m K.

In a similar way, the apparent volumetric heat capacity (C) of the glass microbubble iM30K was calculated using the rule of mixtures, wherein:

C(mixture 1)=C(glycerol)*VF (glycerol)+C$(iM30K)$
*VF $(iM30K)$. After substituting for the volume fractions used for the mixture above and the C for the mixture, C$(iM30K)$ =0.705 MJ/(m$^3$K).

In a similar way, a sample of glass microbubbles, obtained from 3M Company under trade designation "3M GLASS BUBBLES S60" was measured in a 40% by volume mixture with glycerol, prepared in the same manner as in Mixture 1, to provide an apparent K of 0.166 W/mK and an apparent C of 0.745 MJ/(m$^3$K).

Preparation of Composition for First Insulation Region

Composition 1, having 30% by volume iM30K glass microbubbles in polypropylene, and Composition 2, having 20% by volume iM30K glass microbubbles in polypropylene, were prepared by twin screw compounding extrusion, followed by injection molding to provide samples for various testing. A Leistritz ZSE-40 twin-screw extruder (available from American Leistritz Corp., Sommerville, N.J.) was used for compounding the glass microbubbles into polypropylene (obtained from Basell, Hoofddorp, The Netherlands under the trade designation "PRO-FAX SG899"). The glass microbubbles were added downstream using a side stuffer. A general-purpose injection molding machine (Boy 50M, available from Boy Machines Inc., Exton, Pa.) with a three-zone screw (feed, compression and metering) was used to injection mold Type IV dogbone samples, 16.5 cm (6.495 inches) in length (as described in ASTM D638, the disclosure of which is incorporated herein by reference).

Volumetric Heat Capacities of Composition 1 and Composition 2

The specific heat capacities of Composition 1 and Composition 2 was measured using a Pyris 1 Differential Scanning Calorimeter (DSC), manufactured by Perkin Elmer (Wellesley, Mass.). The "three curve" method (which requires sample, baseline, and reference runs in accordance with ASTM 1269E, the disclosure of which is incorporated herein by reference) was used, calibrating against a known sapphire reference. The heat capacity was measured in nitrogen atmosphere over a range of 24° C. to 104° C. in 20° C. segments. A description of this method for measuring specific heat capacity can be found in "Thermal Characterization of Polymeric Materials" by Bernhard Wunderlich in *Thermal Analysis*, (Academic Press, 1981, Edith A. Turi, Ed.) in Chapter 2, Page 91, the disclosure of which is incorporated herein by reference. The results of DSC testing were in units of J/g K, which were converted to volumetric heat capacity units by multiplying the DSC results by the density of the composition in the units of g/cm$^3$ to obtain J/cm$^3$ K. The volumetric heat capacities for Composition 1 and Composition 2 are provided in Table 2 (below).

TABLE 2

| Property | Composition 1 | Composition 2 |
|---|---|---|
| Volumetric Heat Capacity at 24° C. (MJ/(m$^3$K)) | 1.253 | 1.409 |
| Volumetric Heat Capacity at 44° C. (MJ/(m$^3$K)) | 1.285 | 1.399 |

TABLE 2-continued

| Property | Composition 1 | Composition 2 |
| --- | --- | --- |
| Mold Shrinkage (%) | 1.0 | 1.2 |
| CTE from −30 to 30 C. (mm/m ° C.) | 77.2 | 90.4 |
| CTE from 90 to 150 C. (mm/m ° C.) | 108.9 | 168.1 |

Mold Shrinkage for Composition 1 and Composition 2

The mold dimensions in the long direction for the Type IV dogbone mold of Composition 1 and Composition 2 were measured using vernier calipers. The lengths of 4 injection molded specimen for each composition were measured immediately after cool down using vernier calipers. The % shrinkage was then calculated using the following equation:

$$\% \text{ Shrinkage}=[(L_0-L)\times 100]/L_0$$

$L_0$: Mold Dimension (length) of Type IV dogbones, 16.5 cm (6.495 inches)
L: Average length of 4 injection molded test specimens The results are given in Table 2 (above).

The mold shrinkage for an unfilled polypropylene copolymer is 1.5% to 2% as listed in "Lower Extremity Thermoplastics: An Overview", William Clover Jr., Journal of Prosthetics and Orthotics, Volume 3, Number 1, 1991, pp. 9-13.

Coefficient of Linear Thermal Expansion for Composition 1 and Composition 2

The procedure described above for preparing Composition 1 and Composition 2 was repeated except flex bar samples were made by injection molding (following the procedure described in ASTM D790, the disclosure of which is incorporated herein by reference). Test specimens 0.25 inches (0.635 cm)×0.25 inches (0.635 cm)×0.125 inches (0.3175 cm) were then cut from the flex bar samples.

The coefficient of linear thermal expansion was measured using a Thermomechanical Analyzer (Perkin Elmer TMA7) in compression mode with 50 mN applied force and an expansion probe. Each sample was programmed at 10° C./minute from −60° C. to +150° C. Duplicate samples were run for each formulation. The extrapolated onset of the glass transition (Tg) was noted and the coefficient of thermal expansion (CTE) was calculated between −30° C. and +30° C. (below Tg), as well as between 90° C. and 150° C. (above Tg). The results are given in Table 2 (above).

Compositions 1 and 2 can be used as a first insulation region and can be coated, for example, on a conduit using a side extrusion or cross-head extrusion process.

Thermal Conductivity of a Composition ("Composition 3") for an Exemplary Second Insulation Region.

The thermal conductivity of a sample of glass bubble filled polypropylene composite foam of average density 0.75 g/cm³ (obtained from Emerson and Cuming, Billerica, Mass.) and containing glass bubbles marketed by 3M Company under the trade designations "3M GLASS BUBBLES K46" was measured on the LaserComp Fox50 Heat Flow Meter using the method described for Compositions 1 and 2 at the mean temperatures given in Table 3 (below).

TABLE 3

| Mean Temperature (° C.) | K at Upper Plate (W/mK) | K at Lower Plate (W/mK) | Average K (W/mK) |
| --- | --- | --- | --- |
| 57.5 | 0.17 | 0.17 | 0.17 |
| 37.5 | 0.17 | 0.17 | 0.17 |

Composition 3 can be used as a second insulation region and can be coated, for example, on a conduit using a side extrusion or cross-head extrusion process.

Various modifications and alterations of this invention may be made by those skilled in the art without departing from the scope and spirit of this invention, and it should be understood that this invention is not to be unduly limited to the illustrative embodiments set forth herein.

What is claimed is:

1. An insulated article, comprising:
an article having a surface;
a first insulation region substantially covering the surface of the article, the first insulation region having a first thermal conductivity and a first volumetric heat capacity, the first insulation region comprising a first polymeric material and at least 10% by volume first hollow ceramic microspheres, based on the total volume of the first insulation region, wherein the first polymeric material has a second thermal conductivity and a second volumetric heat capacity, wherein the first thermal conductivity is no greater than the second thermal conductivity, and wherein the first volumetric heat capacity is in a range from 60% to 90% of the second volumetric heat capacity; and
a second insulation region substantially covering the surface of the article, the second insulation region having a third thermal conductivity and a third volumetric heat capacity, the second insulation region comprising a second polymeric material and second hollow ceramic microspheres, wherein the second polymeric material has a fourth thermal conductivity and a fourth volumetric heat capacity, wherein the third thermal conductivity is not greater than 90% of the fourth thermal conductivity, wherein the third volumetric heat capacity is less than 60% of the fourth volumetric heat capacity, and wherein the first polymeric material and the second polymeric material are independently selected from the group consisting of thermoplastics, thermosets, and mixtures thereof, with at least one of (a) the proviso that at least one of the first polymeric material or the second polymeric material is a thermoplastic or (b) the proviso that the first insulation region is interposed between the article and the second insulation region.

2. The insulated article of claim 1, wherein the first polymeric material and the second polymeric material are independently thermoplastics comprising at least one of polypropylene or polyethylene.

3. The insulated article of claim 2, wherein the thermoplastic is polypropylene.

4. The insulated article of claim 1, wherein at least one of the first polymeric material or the second polymeric material is independently a thermoset selected from the group consisting of epoxy, polyurethane, silicone, and polyester.

5. The insulated article of claim 1, wherein the first hollow ceramic microspheres are glass microbubbles having an average true density in a range from 0.5 g/cm³ to 1.2 g/cm³.

6. The insulated article of claim 5, wherein the article comprises a conduit.

7. The insulated article of claim 5, wherein the insulated article is submerged in water at a depth of at least 100 meters and wherein the article contains at least oil within.

8. The insulated article of claim 5, wherein the second hollow ceramic microspheres are glass microbubbles having an average true density in a range from 0.1 g/cm³ to 0.5 g/cm³.

9. The insulated article of claim 5, wherein the first polymeric material is polypropylene.

10. The insulated article of claim 1, wherein the second hollow ceramic microspheres are glass microbubbles having an average true density in a range from 0.1 g/cm$^3$ to 0.5 g/cm$^3$.

11. The insulated article of claim 1, wherein the first hollow ceramic microspheres comprise at least 20% by volume of the first insulation region, based on the total volume of the first insulation region.

12. The insulated article of claim 1, wherein the first insulation region and the second insulation region are located in separate layers.

13. The insulated article of claim 1, further comprising a third insulation region interposed between the first insulation region and the second insulation region, the third insulation region comprising a gradient of first hollow ceramic microspheres and second hollow ceramic microspheres.

14. The insulated article of claim 1, wherein the article comprises a conduit.

15. A method of transporting oil, the method comprising introducing oil into an end of the conduit of claim 14 and causing the oil to flow through the conduit.

16. The insulated article of claim 1, wherein the insulated article is submerged in water at a depth of at least 100 meters, and wherein the article contains at least oil within.

17. The insulated article of claim 1, wherein the first insulation region is interposed between the surface of the article and the second insulation region.

18. The insulated article of claim 1, wherein the second insulation region is interposed between the surface of the article and the first insulation region.

19. A method for making a composition for insulating an article having a surface, the method comprising:
    obtaining requirements data defining thermal requirements for a first insulation region having a first thermal conductivity and a first volumetric heat capacity and a second insulation region having a third thermal conductivity and a third volumetric heat capacity, wherein the first insulation region and the second insulation region substantially cover the surface of the insulated article;
    based at least partially on the thermal requirements for the first insulation region, generating a first formulation for a composition for the first insulation region, the composition comprising a first polymeric material selected from the group consisting of thermoplastics, thermosets, and mixtures thereof and at least 10% by volume first hollow ceramic microspheres, based on the total volume of the first insulation region, wherein the first polymeric material has a second thermal conductivity and a second volumetric heat capacity, wherein the first thermal conductivity is no greater than the second thermal conductivity, and wherein the first volumetric heat capacity is in a range from 60% to 90% of the second volumetric heat capacity;
    based at least partially on the thermal requirements for the second insulation region, generating a second formulation for a composition for the second insulation region, the composition comprising a second polymeric material selected from the group consisting of thermoplastics, thermosets, and mixtures thereof and second hollow ceramic microspheres, wherein the second polymeric material has a fourth thermal conductivity and a fourth volumetric heat capacity, wherein the third thermal conductivity is not greater than 90% of the fourth thermal conductivity, and wherein the third volumetric heat capacity is less than 60% of the fourth volumetric heat capacity;
    making a composition for the first insulation region having the first formulation; and
    making a composition for the second insulation region having the second formulation.

20. The method according to claim 19, further comprising applying the compositions for the first and second insulation regions to the article.

* * * * *